(12) United States Patent
Do et al.

(10) Patent No.: US 7,556,870 B2
(45) Date of Patent: Jul. 7, 2009

(54) ANTIFERROMAGNETICALLY COUPLED MEDIA FOR MAGNETIC RECORDING WITH WEAK COUPLING LAYER

(75) Inventors: Hoa Van Do, Fremont, CA (US); Eric Edward Fullerton, Morgan Hill, CA (US); David Thomas Margulies, Salinas, CA (US); Natacha Frederique Supper, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 596 days.

(21) Appl. No.: 11/204,979

(22) Filed: Aug. 15, 2005

(65) Prior Publication Data

US 2007/0037017 A1    Feb. 15, 2007

(51) Int. Cl.
*G11B 5/66* (2006.01)
(52) U.S. Cl. .................... 428/828.1; 428/829
(58) Field of Classification Search ........... None
See application file for complete search history.

(56) References Cited

U.S. PATENT DOCUMENTS

| | | | |
|---|---|---|---|
| 5,462,796 A | 10/1995 | Teng et al. | |
| 5,861,220 A | 1/1999 | Coughlin | |
| 6,007,924 A | 12/1999 | Lal et al. | |
| 6,372,330 B1 | 4/2002 | Do et al. | |
| 6,383,668 B1 | 5/2002 | Fullerton et al. | |
| 6,773,834 B2 | 8/2004 | Do et al. | |
| 6,777,112 B1 | 8/2004 | Girt et al. | |
| 6,830,824 B2* | 12/2004 | Kikitsu et al. | 428/828.1 |
| 6,852,426 B1* | 2/2005 | Girt et al. | 428/611 |
| 7,271,984 B2* | 9/2007 | Umeda et al. | 360/131 |
| 7,488,545 B2* | 2/2009 | Fullerton et al. | 428/828.1 |
| 2002/0064689 A1 | 5/2002 | Yamanaka et al. | |
| 2002/0098390 A1* | 7/2002 | Do et al. | 428/694 TS |
| 2003/0134150 A1 | 7/2003 | Hong et al. | |
| 2003/0180577 A1 | 9/2003 | Do et al. | |

(Continued)

FOREIGN PATENT DOCUMENTS

JP    3160615    7/1991

(Continued)

OTHER PUBLICATIONS

Chen, Chang, Chih-Huang, "Lattaice-Matching Consideration in Pseudo-AFC Structure", IEEE Transactions on Magnetics, vol. 39, No. 5, Sep. 2003.

*Primary Examiner*—Kevin M Bernatz
(74) *Attorney, Agent, or Firm*—G. Marlin Knight

(57) ABSTRACT

An embodiment of the invention is a layered magnetic thin film structure that uses antiferromagnetically coupled (AFC) magnetic layers where the top layer structure consists of an upper magnetic layer that is weakly ferromagnetically coupled via a nonmagnetic or weakly magnetic exchange coupling layer (interlayer) to a ferromagnetic exchange enhancing layer that is in turn, AF coupled to the lower ferromagnetic layer of the AFC structure. Preferred materials for the weak coupling layer include alloys of cobalt such as CoRu, CoBRu and CoCr in which the Co content is below the point at which the material would be ferromagnetic. A second embodiment of the invention is a laminated, AF-coupled media structure. In this structure the lower AFC layer that makes up the lower laminate layer includes: the middle magnetic layer, the weak ferromagnetic coupling layer, and the exchange enhancing layer.

16 Claims, 5 Drawing Sheets

U.S. PATENT DOCUMENTS

| | | | |
|---|---|---|---|
| 2004/0166371 A1* | 8/2004 | Berger et al. | 428/694 T |
| 2005/0259362 A1* | 11/2005 | Do et al. | 360/135 |
| 2006/0177704 A1* | 8/2006 | Berger et al. | 428/829 |
| 2006/0183003 A1* | 8/2006 | Minardi et al. | 428/828 |
| 2006/0210835 A1* | 9/2006 | Do et al. | 428/828.1 |

FOREIGN PATENT DOCUMENTS

| | | |
|---|---|---|
| JP | 10289434 | 10/1998 |
| JP | 2000322724 | 11/2000 |
| JP | 2002092844 | 3/2002 |
| WO | WO96/25734 | 8/1996 |

* cited by examiner

US 7,556,870 B2

ANTIFERROMAGNETICALLY COUPLED MEDIA FOR MAGNETIC RECORDING WITH WEAK COUPLING LAYER

RELATED APPLICATIONS

Co-pending, commonly assigned application bearing Ser. No. 10/628011 filed on Jun. 11, 2003 describes a laminated antiferromagnetically coupled magnetic recording medium with three magnetic layers separated by two nonmagnetic spacer layers with the middle and bottom layers being antiferromagnetically coupled, and the upper magnetic layer having a higher magnetic anisotropy than the middle magnetic layer. The magnetic anisotropy can be adjusted primarily by changing the platinum content versus the cobalt content of a cobalt based magnetic alloy such as CoPtCr or CoPtCrB. The magnetization can be adjusted by altering the chromium and/or the boron content versus the cobalt content. Lowering the chromium content and increasing the cobalt content increases the magnetization.

FIELD OF THE INVENTION

The invention relates to magnetic thin film media with laminated or antiferromagnetically coupled ferromagnetic layers and more particularly to methods for coupling and decoupling ferromagnetic thin films in such media.

BACKGROUND OF THE INVENTION

A typical prior art head and disk system 10 is illustrated in block form in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) in the magnetic medium included in the thin films 21 and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

The conventional disk 16 includes substrate 26 of glass or AlMg with an electroless coating of NiP that has been highly polished. The thin films 21 on the disk 16 typically include a chromium or chromium alloy underlayer and at least one ferromagnetic layer based on various alloys of cobalt, platinum and chromium. Additional elements such as tantalum and boron are often used in the magnetic alloy. A protective overcoat layer is used to improve wearability and corrosion resistance. Various seed layers, multiple underlayers and multilayered magnetic films have all been described in the prior art. Laminated magnetic films include multiple ferromagnetic layers that are substantially decoupled. Seed layers are used with nonmetallic substrate materials such as glass. Typically the seed layer is a relatively thin crystalline film which is the first layer deposited on the substrate. Materials proposed for use as seed layers include chromium, titanium, tantalum, MgO, tungsten, CrTi, FeAl, NiAl and RuAl. The use of pre-seed layers 31 is relatively recent practice. The pre-seed layer is a non-crystalline thin film which provides a base for growing the subsequent crystalline films that is superior to the substrate for this purpose.

FIG. 2 illustrates a prior art layer structure 21 of a thin film magnetic disk 16 in which the layer stack according to the invention can be used. The substrate 26 is commonly AlMg/NiP or glass. The layers under the underlayer 33 may be any of several combinations of seed layers 32 and pre-seed layers 31 according to the prior art. The layer structure shown in FIG. 2 can be used with a variety of magnetic layer stacks 34. The magnetic layer stack 34 is composed of a plurality of layers in the prior art including laminated and AF-coupled forms.

Many approaches have been described to improve the media signal to noise ratio (SNR) in magnetic recording media. These techniques often require changing the composition of the magnetic alloy or underlayer, or manipulating the process conditions to achieve the desired microstructure. Another well-established technique for improving media SNR in longitudinal media is by laminating two or more magnetic media layers separated by non-magnetic interlayers. Laminated structures are thought to work best if the two magnetic layers are magnetically uncorrelated and act as independent noise sources. If this holds for two magnetic layers, a 3-dB gain in SNR is expected for the laminated structure as compared to the signal film. This improvement has been described in detail for longitudinal AFC media in U.S. Pat. No. 6,372,330 to Do, et al. This improvement in SNR was achieved in these films without a degradation of other recording performance parameters. The use of lamination for noise reduction has been extensively studied to find favorable spacer layer materials, including Cr, CrV, Mo and Ru, and spacer thicknesses, from a few angstroms upward, that result in the best decoupling of the magnetic layers and the lowest media noise.

However, the applicability of laminated media in longitudinal recording is limited by thermal stability concerns. As the densities of magnetic storage increase, Mrt (the product of the remanent magnetization and the medium thickness) has decreased and the coercive fields $H_c$ have increased. To achieve this reduction in Mrt, the thickness t can be reduced, but only to a limit. Magnetic media often exhibit (i) decreasing coercive fields and (ii) increasing magnetic decay with decreasing film thickness. These phenomena have been attributed to thermal activation of small magnetic grains or small regions of magnetization (the superparamagnetic effect). The stability of the magnetic media is proportional to KuV, where Ku is the magnetic anisotropy constant of the media and V is the volume of the magnetic grain. As the media thickness is decreased, V also decreases. If the film thickness is too thin, the stored magnetic information is no longer stable in normal hard-drive operating conditions. In conventional laminated media, these problems are exacerbated. For a given Mrt of the composite film structure, each layer will have half the Mrt and, therefore, the onset of the superparamagnetic effect occur for larger Mrt values. Laminated AFC improves this situation but is still limited by thermal stability concerns.

One approach to the solution of this problem is to use a higher anisotropy material, i.e. one with a higher $K_u$. However, the increase in $K_u$ is limited by the point where the coercivity $H_c$, which is approximately equal to $K_u/M_r$, becomes too great to be written by a practical write head. A similar approach is to reduce the $M_r$ of the magnetic layer for a fixed layer thickness, but this is also limited by the coercivity that can be written. Another solution is to increase the intergranular exchange, so that the effective magnetic volume V of the magnetic grains is increased. However, this approach has been shown to be deleterious to the intrinsic signal-to-noise ratio (S0NR) of the magnetic layer.

In U.S. Pat. No. 6,280,813 to Carey, et al. a layer structure is described that includes at least two ferromagnetic films antiferromagnetically coupled together across a nonferromagnetic coupling/spacer film. Antiferromagnetic coupling (AFC) maintains stability of the media with reductions in $M_r t$. In general, the exchange coupling oscillates from ferromagnetic to antiferromagnetic with increasing coupling/spacer film thickness and that the preferred 6 Angstrom thickness of the ruthenium coupling/spacer layer was selected because it corresponds to the first antiferromagnetic peak in the oscillation for the particular thin film structure. Materials that are appropriate for use as the nonferromagnetic coupling/spacer films include ruthenium (Ru), chromium (Cr), rhodium (Rh), iridium (Ir), copper (Cu), and their alloys. Because the magnetic moments of the two antiferromagnetically coupled films are oriented antiparallel, the net remanent magnetization-thickness product ($M_r t$) of the recording layer is the difference in the $M_r t$ values of the two ferromagnetic films. An embodiment of the structure includes two ferromagnetic CoPtCrB films, separated by a Ru spacer film having a thickness selected to maximize the antiferromagnetic exchange coupling between the two CoPtCrB films. The top ferromagnetic layer is designed to have a greater $M_r t$ than the bottom ferromagnetic layer, so that the net moment in zero applied magnetic field is low, but nonzero. The Carey '813 patent also states that the antiferromagnetic coupling is enhanced by a thin (5 Angstroms) ferromagnetic cobalt interface layer added between the coupling/spacer layer and the top and/or bottom ferromagnetic layers. The patent mentions, but does not elaborate on the use CoCr interface layers. FIG. 3 is an illustration of a magnetic layer stack 34 for a magnetic thin film disk according to the prior art using an exchange enhancing layer 38 under the top magnetic layer 36 in an AF-coupled magnetic structure. The lower magnetic layer 41 is deposited first and serves the role of the slave layer in the AF-coupled structure. The spacer 39 is selected to achieve antiferromagnetic (AF) coupling between the lower magnetic layer and the magnetic layers above it.

In U.S. Pat. No. 6,567,236 to Doerner, et al. (May 20, 2003) an antiferromagnetically coupled layer structure is described for magnetic recording wherein the top ferromagnetic structure is a bilayer structure including a relatively thin first sublayer of ferromagnetic material in contact with the coupling/spacer layer. The first sublayer has a higher magnetic moment than the second sublayer. The second sublayer has a lower magnetic moment and is much thicker than the first sublayer with a composition and thickness selected to provide the $M_r t$, when combined with the first sublayer, that is needed for the overall magnetic structure. A preferred embodiment of a layer structure according to the patent is a pre-seed layer of CrTi; a seed layer of RuAl; an underlayer of CrTi; a bottom ferromagnetic layer of CoCr; an AFC coupling/spacer layer of Ru; and a top ferromagnetic structure including: a thin first sublayer of CoCr, CoCrB or CoPtCrB, and a thicker second sublayer of material of CoPtCrB with a lower moment than the first sublayer.

Published US patent application 2002/0098390 by H. V. Do, et al., describes a laminated medium for horizontal magnetic recording that includes an antiferromagnetically coupled (AFC) magnetic layer structure and a conventional single magnetic layer. The AFC magnetic layer structure has a net remanent magnetization-thickness product ($M_r t$) which is the difference in the $M_r t$ values of its two ferromagnetic films. The type of ferromagnetic material and the thickness values of the ferromagnetic films are chosen so that the net moment in zero applied field will be low, but nonzero. The $M_r t$ for the media is given by the sum of the $M_r t$ of the upper magnetic layer and the $M_r t$ of the AF-coupled layer stack. This allows control of the $M_r t$ independently from either $M_r$ or t. Alternatively, the magnetization (the magnetic moment per unit volume of material) of the two ferromagnetic films may be made different by using different ferromagnetic materials for the two. In a laminated medium each of the magnetic layers contributes to the readback signal; therefore, the net magnetic moment of the AFC layer stack must be non-zero. The nonferromagnetic spacer layer between the AFC layer and the single ferromagnetic layer has a composition and thickness to prevent substantial antiferromagnetic exchange coupling. The laminated medium has improved thermal stability from the antiferromagnetic coupling and reduced intrinsic media noise from the lamination.

SUMMARY OF THE INVENTION

A first embodiment of the invention is a layered magnetic thin film structure that is composed of an antiferromagnetically coupled (AFC) media structure where the top layer set of the AFC structure consists of an upper magnetic layer that is weakly ferromagnetically coupled via a nonmagnetic or weakly magnetic exchange coupling layer (interlayer) to a ferromagnetic exchange enhancing layer that is in turn, antiferromagnetically coupled to the lower ferromagnetic layer of the AFC structure. The media of the invention demonstrates improved performance over traditional AFC media structures with increased AF coupling, lower coercivity of the composite structure and improved growth of the upper layer. Preferred materials for the weak coupling layer include alloys of cobalt such as CoRu, CoBRu and CoCr in which the Co content is below the point at which the material would be substantially ferromagnetic at room temperature. Alternatively the weak coupling layer can be a paramagnetic material such as platinum (Pt) and palladium (Pd).

The exchange enhancing layer is preferably a ferromagnetic Co alloy selected according to the prior art, optionally including Cr, and any of the elements typically used in magnetic recording materials such as B, Ta, Ti, etc. The exchange coupled structures according to the invention will be referred to as 'exchange-spring' media.

A second embodiment of the invention is a laminated, AF-coupled media structure. In this structure the lower AFC layer, that makes up the lower laminate layer, includes:
the middle magnetic layer;
the weak ferromagnetic coupling layer; and
the exchange enhancing layer.

DETAILED DESCRIPTION OF THE INVENTION AND THE PREFERRED EMBODIMENTS

Figure 4:
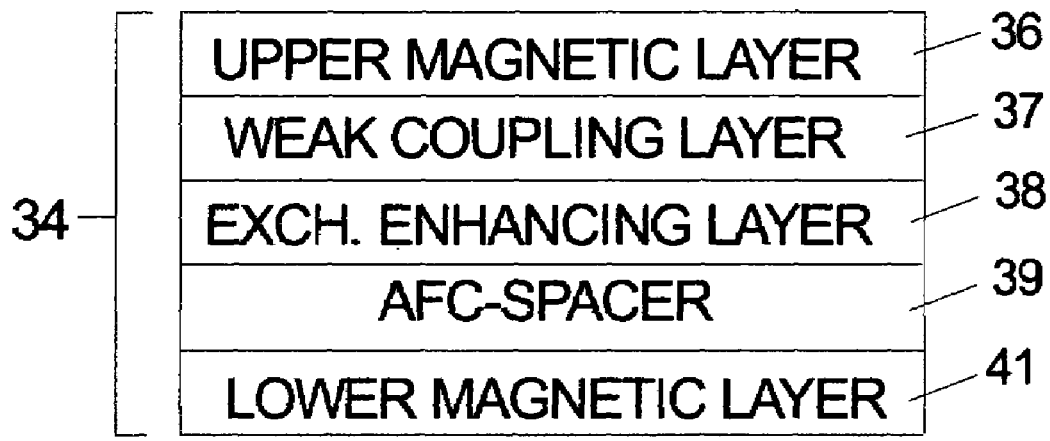
FIG. 4 is an illustration of an embodiment of a magnetic layer stack for a magnetic thin film disk according to the invention.

FIG. 4 is an illustration of a magnetic layer stack 34 for a magnetic thin film disk according to the invention. The thicknesses of the layers in FIG. 4 are not according to scale. For example, the upper magnetic layer 36 can be expected to be thicker than the other layers. Except where noted below the thicknesses of the layers can be determined according to the prior art. The lower magnetic layer 41 is deposited first and serves the role of the slave layer in the AF-coupled structure. The slave layer 41 switches magnetic orientation as a result of coupling with the magnetic layers above it, so it is not written directly by the head field. The spacer 39 is selected according to prior art principles to achieve antiferromagnetic (AF) coupling between the lower magnetic layer and the magnetic layers above it. The exchange enhancing layer 38 has the weak coupling layer 37 deposited on it. The exchange enhancing layer is preferably a ferromagnetic Co alloy, optionally including Cr, and any of the elements typically used in magnetic recording materials such as B, Ta, Ti, etc. The composition of the exchange enhancing layer can be determined according to the prior art. For example, if CoB is used the boron content is preferably from 5 to 30 atomic percent and even more preferably from 12 and 18 atomic percent of boron. If chromium is included it is preferably less than 20 atomic percent. If tantalum is included, it is preferably less than 5 atomic percent. The cobalt is preferably greater than 70 atomic percentage even if more than one of the optional elements are included. Thus, the total of the elements other than cobalt should be less than 30 atomic percent.

The weak coupling layer 37 is a nonmagnetic or weakly magnetic interlayer that ferromagnetically couples the ferromagnetic exchange enhancing layer 38 to the upper magnetic layer 36. "Weak coupling" as used herein is significantly less than direct exchange coupling. If the ferromagnetic coupling is given by J (in ergs/cm$^2$) then the effective coupling field acting on the thin ferromagnetic layer that is coupled to the media layer is about $H_{ex}$=J/Mt where M is the moment density of the thin layer and t is its thickness. Within the design of the media, this effective field should be comparable to the available write field (for example, about 10 kOe). This sets the value of the preferred J.

In one preferred embodiment, an alloy of cobalt and ruthenium is used for the weak coupling layer 37. Cobalt (Co) and ruthenium (Ru) are completely soluble with each other and with a large enough atomic percentage of Co, CoRu will be ferromagnetic. Therefore, by optimizing the Co content at a point just below the point at which the alloy would be intrinsically ferromagnetic at room temperature, it acts to weakly ferromagnetically couple the layers above and below it according to the invention. The precise amount of Co can be determined by modeling or empirically. In general the choice for the weak ferromagnetic coupling layer is a material that is nearly ferromagnetically ordered or would order below room temperature. Therefore, a material which is nonmagnetic at room temperature and magnetic below room temperature can be used for the weak ferromagnetic coupling layer. The CoRu embodiment preferably has from 50 to 80 atomic percentage of Ru with 50 to 70 atomic percentage Ru being even more preferred.

In another preferred embodiment, an alloy of cobalt, ruthenium and boron is used for the weak coupling layer 37. Compositional ranges for this alloy of cobalt are preferably from 0 to 15 atomic percentage boron and 50 to 80 atomic percentage ruthenium. The addition of boron (B) can be used to control the grain size of the alloy.

Another choice for the weak ferromagnetic coupling layer is CoCr in which the Co content can likewise be selected to be below the point at which the material is ferromagnetic according to prior art principles. The range of chromium is preferably from 25 to 40 atomic percent.

The weak ferromagnetic coupling layer 37 can also be paramagnetic materials such as platinum (Pt) and palladium (Pd) which tend to couple layers ferromagnetically (as opposed the oscillatory coupling observed for Ru). When paramagnetic materials are used the thickness of the weak ferromagnetic coupling layer is selected to achieve the desired weak ferromagnetic coupling.

One requirement is that the weak ferromagnetic coupling layer be compatible with the growth of the following thin film layers. The alternative materials described above meet this criterion for a range of practical magnetic materials which can be used for the upper magnetic layer. For example, an upper magnetic layer such as a CoPtCrB alloy layer will grow well on CoRu. The alternative materials such as CoCr or many paramagnetic Co-alloys also have been used as a growth onset layer for the magnetic layers and could be acceptable choices.

Figure 1:
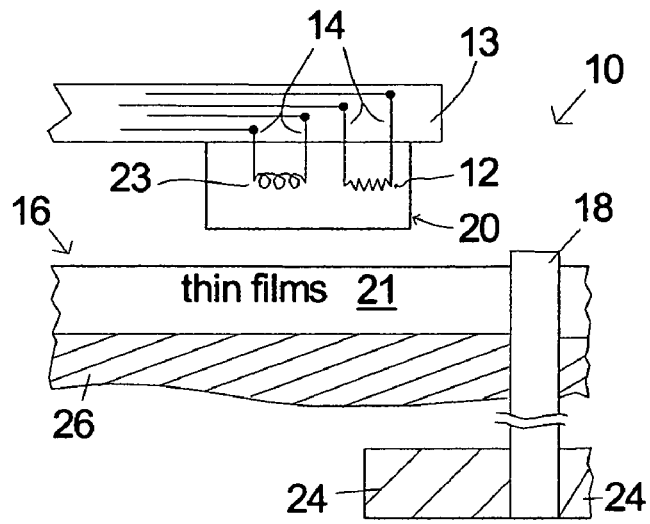
FIG. 1 is a symbolic illustration of the prior art showing the relationships between the head and associated components in a disk drive.
Figure 2:
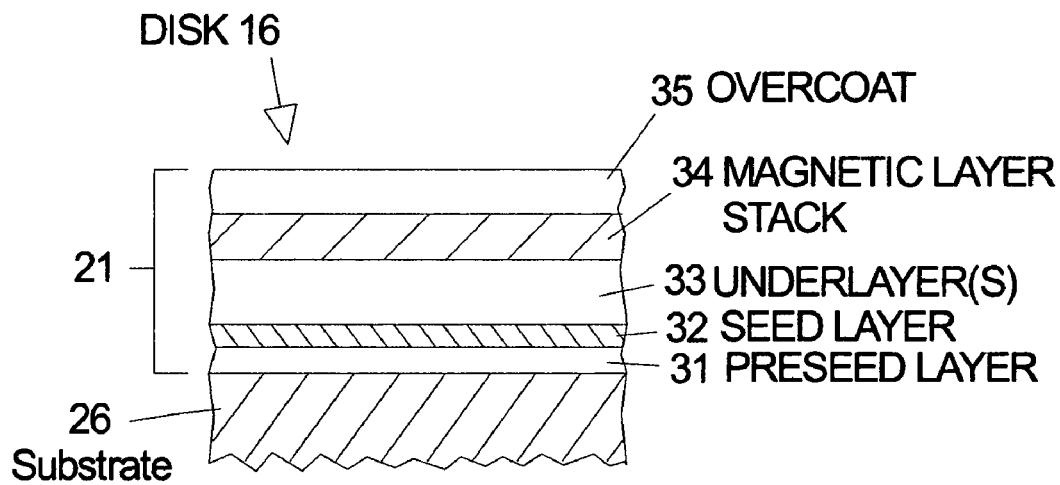
FIG. 2 is an illustration of a prior art layer structure for a magnetic thin film disk with which the magnetic layer stack of the invention can be used.
Figure 3:
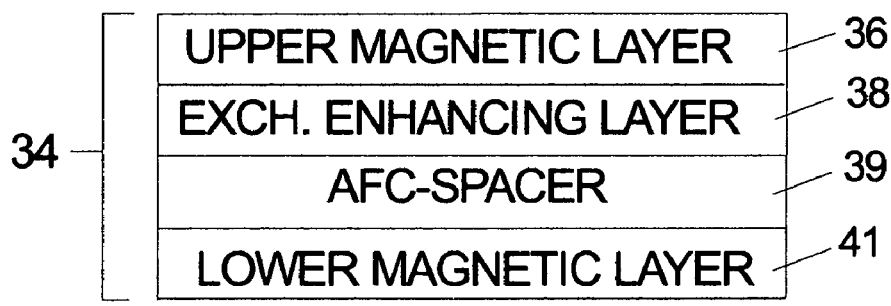
FIG. 3 is an illustration of a prior art layer structure for a magnetic thin film disk with which the magnetic layer stack of the invention can be used.

One advantage of the invention is in enhanced the AF coupling across the spacer layer 39 (which is typically Ru). As illustrated in FIG. 3, it is known in the prior art that by placing a thin high moment layer (exchange enhancing layer) next to the Ru spacer layer the AF-coupling between the upper and lower ferromagnetic layers can be enhanced. However, the high moment layer on top of the Ru layer can add lateral exchange coupling between the grains in the upper layer and decrease the media SNR. This problem can be mediated according to the invention by inserting a thin, weak coupling layer 37 that weakly ferromagnetically couples the media layer (the upper magnetic layer) to the high moment exchange enhancing layer 38 but does not allow direct ferromagnetic exchange.

Figure 5:
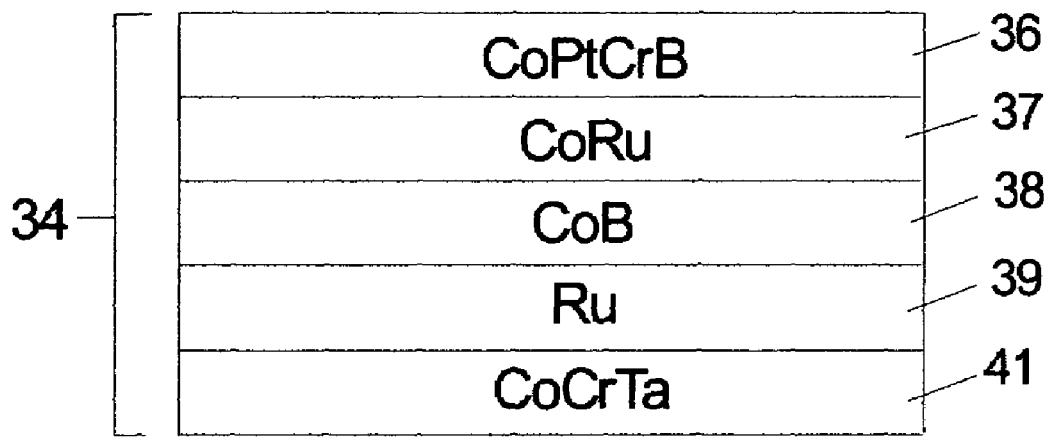
FIG. 5 is an illustration of a preferred embodiment of a magnetic layer stack for a magnetic thin film disk according to the invention.

A preferred embodiment of the invention is illustrated in FIG. 5 where CoB is used for the exchange enhancing layer 38. A sample composition for the exchange enhancing layer 38 is $Co_{86}B_{14}$. CoRu is used for the weak coupling layer 37 and a sample composition is $Co_{40}Ru_{60}$. The thickness of the weak coupling layer 37 is determined according the ferromagnetic coupling J as noted above. The thickness is selected such that for the coupling material choice, the J is in the range of interest. In general the ferromagnetic exchange decreases with increasing thickness and increases with increasing Co content. For CoRu weak coupling layers, with lower Co in the alloy a thinner coupling layer is needed. Thicknesses in the range of 4 to 20 angstroms are reasonable for the weak coupling layer 37.

The thickness of the exchange enhancing layer 38 is determined according to the following principles. The layer has to be thick enough to be ferromagnetic (typically >5 angstroms). The thickness generally depends on the balance of improved ease in writing (which usually increases with increased thickness of this layer) and noise performance which tends to degrade if this layer is too thick. The typical approach is to make it as thick as possible without impacting the noise performance. Thicknesses in the range of 5 to 40 angstroms are typical for the exchange enhancing layer 38.

Figure 6:
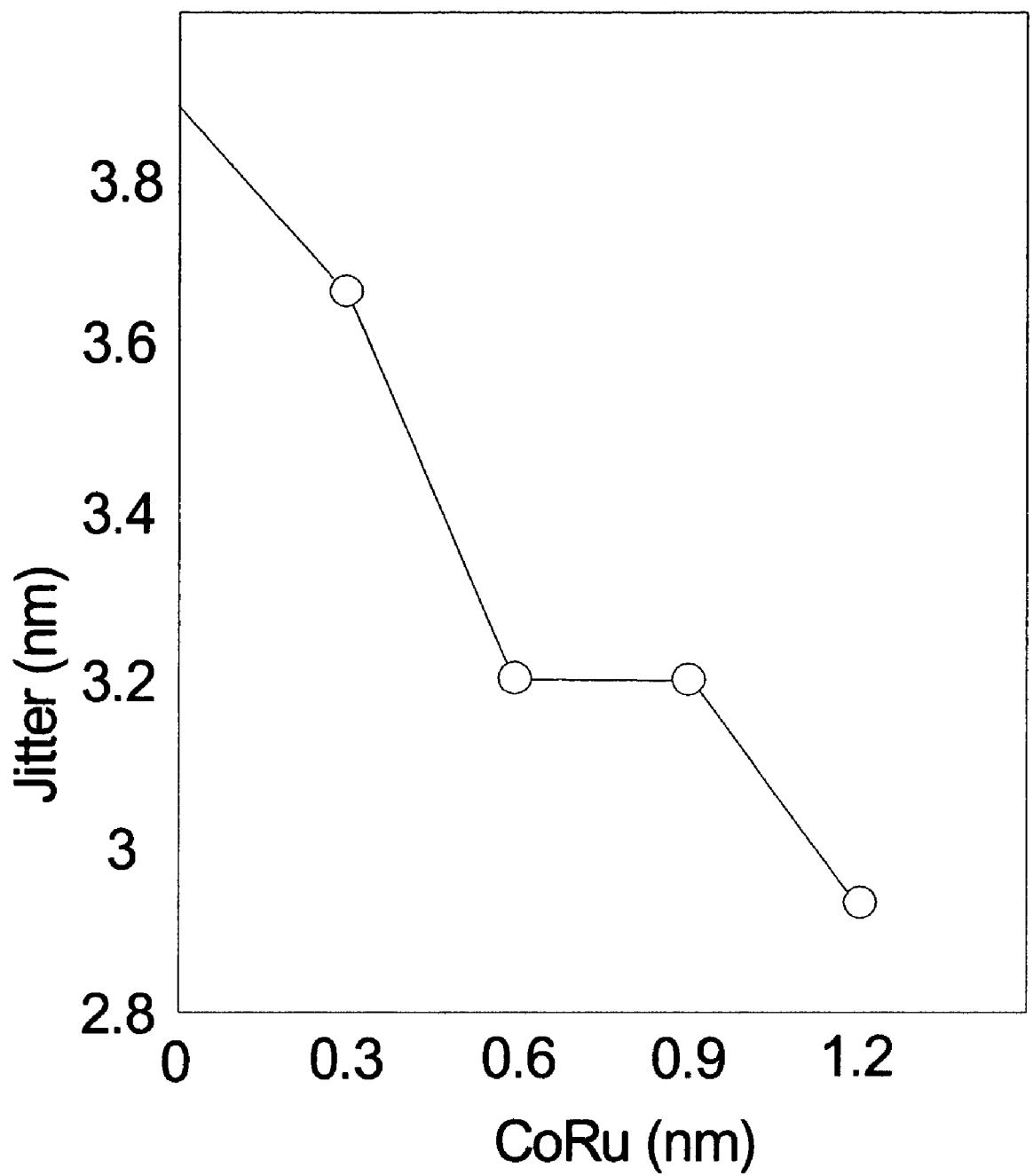
FIG. 6 is a graph of transition jitter vs. CoRu thickness measured in a sample according to the invention.

Inserting the weak coupling layer 37 between the CoB exchange enhancing layer and the upper magnetic layer improves the performance of the composite media. This is shown by the improvement of the transition jitter vs. CoRu thickness. An improvement was observed of >20% in transition jitter with the addition of this interlayer in experimental disks as shown in FIG. 6.

Figure 7:
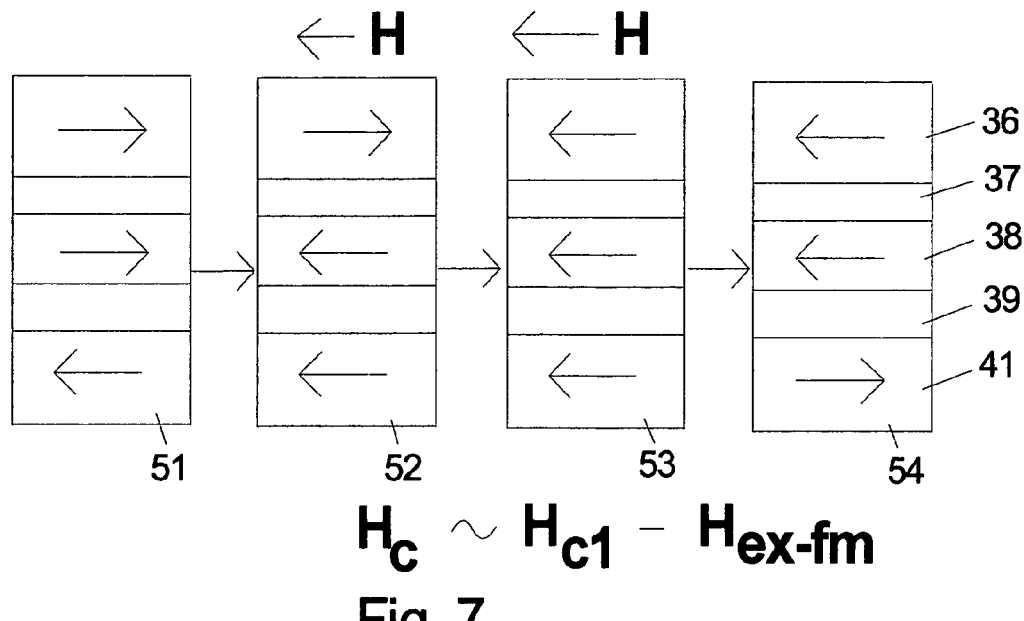
FIG. 7 is an illustration of a magnetization reversal sequence for a magnetic layer stack according to the invention.

A second potential advantage of the invention is that it enables the media to be designed such that it has a non-coherent reversal mechanism. This is shown schematically in FIG. 7 which shows a sample structure and a possible reversal pathway to the lower right of the figure. The three arrows in each block 51, 52, 53, 54 represent the magnetization of the three ferromagnetic layers in the media. Starting in remanence, the top two layers will be parallel and the lower layer will be AF aligned, i.e., antiparallel, as shown in state 51. In this embodiment the exchange enhancing layer 38 has a lower anisotropy than the upper magnetic layer 36. Applying a reverse magnetic field to the upper magnetic layer 36 and the exchange enhancing layer 38, the exchange enhancing layer reverses at a field that is lower than that of the upper layer as shown in state 52. Further increasing the reverse field will cause the high anisotropy upper layer 36 to reverse as shown in state 53. However, this reversal will occur at a field that is significantly lower than a similar prior art structure. The reason is that without the weak coupling layer 37 the upper magnetic layer has to overcome the AF coupling of the lower layer so the switching field will be higher than that of the intrinsic anisotropy field. With the ferromagnetic coupling layer the switching field will be the intrinsic coercive field minus the effective ferromagnetic exchange field acting on the upper layer. Reducing the applied field back to zero, the lower AFC coupled magnetic layer 41 will reverse to its antiparallel remanent state. The structure will be stable where all the exchange energies are satisfied. An additional advantage of the invention is that the additional weak ferromagnetic coupling layer can improve the growth of the upper magnetic layer which is preferably CoPtCrB.

An example of the exchange-spring media structure according to the invention showing improved performance is given below. The data shown in Table 1 compares an AFC structure with and without the weakly ferromagnetically coupled CoBCr/CoRu bilayer according to the invention. Each sample had a CoCrTa lower magnetic layer, an upper magnetic layer of $CoPt_{16}Cr_{18}B_{10}$ and a Ru AFC spacer layer. Sample 2 included a $CoCr_{14}B_8$ exchange enhancing layer and a CoRu weak ferromagnetic coupling layer between the Ru and the top CoPtCrB media layer. The exchange spring sample 2 has a higher $M_rt$, higher coercivity, higher squareness, but is easier to write as demonstrated by the 3-dB higher overwrite (OW) value and has 1-dB better signal-to-noise ratio (SoNR) and 10% improvement in the width of the isolated pulse (PW50).

TABLE 1

| Sample | Mrt | Hc | s* | OW (dB) | SoNR | PW50 |
|---|---|---|---|---|---|---|
| 1 | 0.27 | 4300 | 0.72 | 17 | | |
| 2 (invention) | 0.31 | 4900 | 0.77 | 20 | +1 dB | +10% |

TABLE 2

| Layer Name | Sample 3 | Sample 4 (invention |
|---|---|---|
| $2^{nd}$ sublayer of upper magnetic layer | $CoPt_{12}Cr_{13}B_{15}$ | $CoPt_{12}Cr_{13}B_{15}$ |
| $1^{st}$ sublayer of upper magnetic layer | $CoPt_{14}Cr_{22}B_4Ta_2$ | $CoPt_{14}Cr_{22}B_4Ta_2$ |
| weak ferromagnetic coupling layer | | $(CoB_{14})_{50}Ru_{50}$ (1 nm) |
| exchange enhancing layer | | $CoCr_{-21}B_{-10}$ (1.4 nm) |
| AFC spacer | Ru | Ru |
| lower magnetic layer | $CoCr_{22}B_3Ta_2$ | $CoCr_{22}B_3Ta_2$ |
| $2^{nd}$ underlayer | CrMoB | CrMoB |
| $1^{st}$ underlayer | Cr | Cr |
| substrate | metal substrate | Metal substrate |

The underlayers in samples 3 and 4 were deposited using −250v of bias on the substrates.

Figure 8:
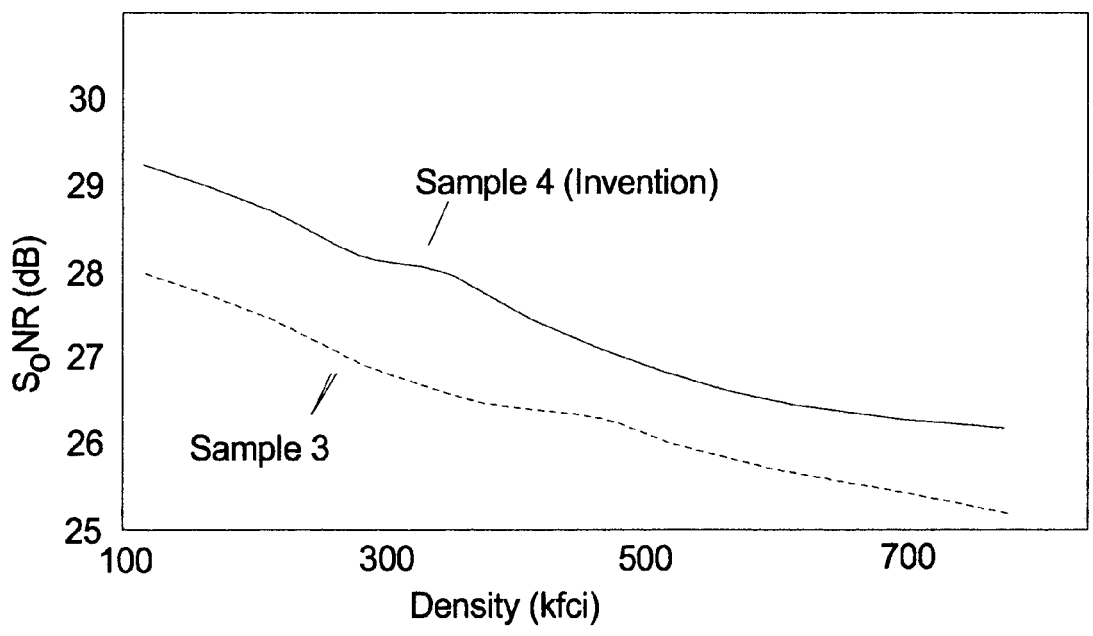
FIG. 8 are the results of a second comparison of an exchange spring structure according to the invention with a prior art structure.

Shown in FIG. 8 and Table 3 are the results of a second comparison of an exchange spring structure with a prior art structure. Table 2 gives the layer structure and compositions for the two samples. Sample 4 included a CoCrB exchange enhancing layer ferromagnetically coupled via a CoRuB weak coupling layer to the upper media layer. For this example the upper media layer is a dual layer structure of $CoPt_{14}Cr_{22}B_4Ta_2$ and $CoPt_{12}Cr_{13}B_{15}$. The two layered magnetic structures (samples 3 and 4) were made identically except for the addition of the CoCrB/CoRuB bilayer according to the invention. The magnetic and recording results comparison is shown in FIG. 8. In this example, the exchange spring sample has a slightly higher Mrt and lower coercivity. However, what is important is that the exchange spring sample 4 has a significantly lower short time coercivity (Ho) so it is much easier to write but has a higher stability as indicated by the KuV/kT. When compared in magnetic recording tests, the exchange spring structure has better SoNR at all frequencies as shown in FIG. 8 and has a better error rate showing significant improvement. The addition of these layer results in easier writing, increased stability and higher performance media. The BER measurements were made with two different signals one with "kick" which is an increased level in part of the signal waveform.

TABLE 3

| Sample | Mrt | Hc | s* | H0 (kOe) | KuV/kT | BER 700 kfci kick | BER 700 kfci no kick |
|---|---|---|---|---|---|---|---|
| 3 | 0.42 | 4020 | 0.81 | 7.0 | 86 | −5.37 | −5.45 |
| 4 (invention) | 0.43 | 3680 | 0.78 | 6.2 | 92 | −5.53 | −5.45 |

The exchange spring structure according to the invention can be incorporated into laminated AFC structures described in US patent application US20020098390 described in the background section. In this embodiment the laminated magnetic recording medium has an antiferromagnetically-coupled (AFC) layer structure and a single ferromagnetic layer spaced apart by a nonferromagnetic spacer layer. The AFC layer structure is formed as two ferromagnetic films or sublayers antiferromagnetically coupled together across an antiferromagnetically coupling film that has a composition and thickness to induce antiferromagnetic coupling. In each of the two remanent magnetic states, the magnetic moments of the two antiferromagnetically-coupled films in the AFC layer are oriented antiparallel, and the magnetic moment of the single ferromagnetic layer and the greater-moment ferromagnetic film of the AFC layer are oriented parallel. The nonferromagnetic spacer layer between the AFC layer and the single ferromagnetic layer has a composition and thickness to prevent antiferromagnetic exchange coupling. The laminated medium has improved thermal stability and reduced intrinsic media noise.

Figure 9:
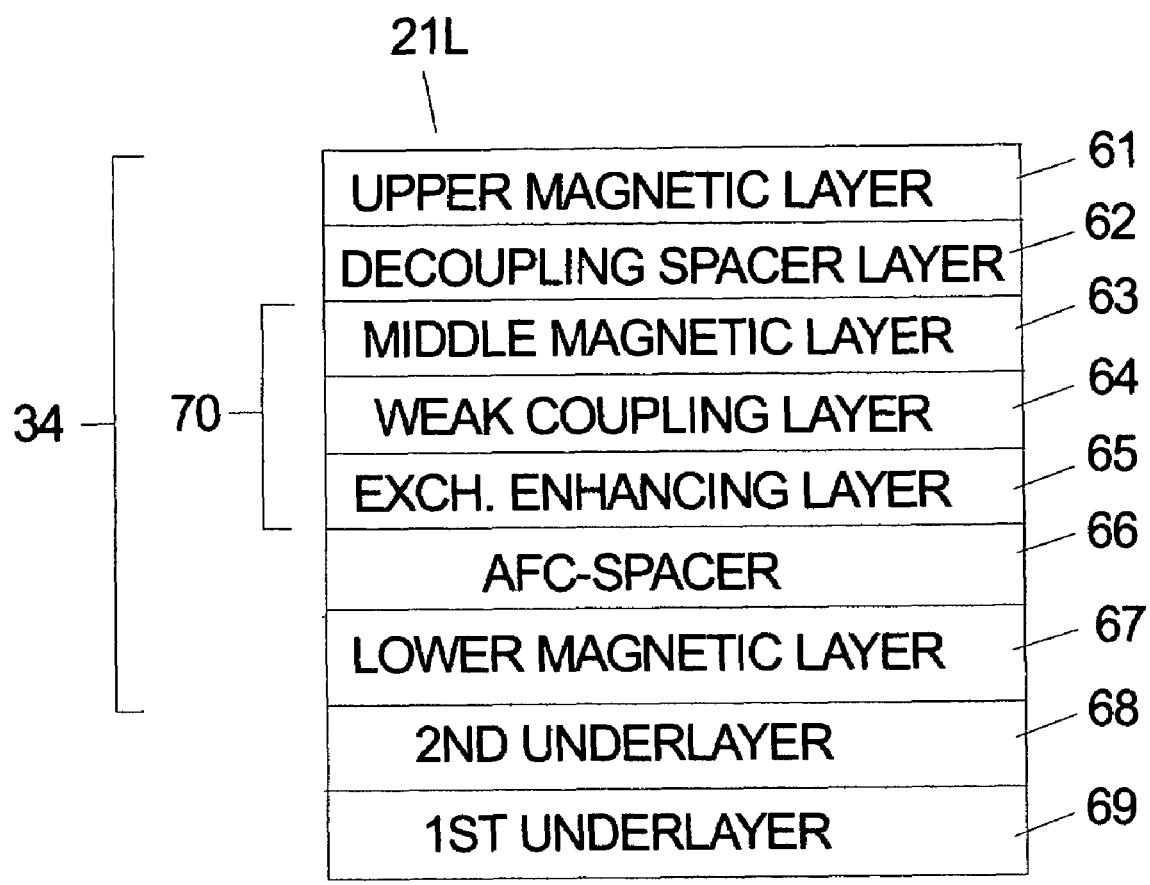
FIG. 9 is an illustration of a preferred embodiment of a laminated, AFC magnetic layer stack for a magnetic thin film disk according to the invention.

The schematic structure for an embodiment of the present invention in a laminated structure media structure 21L is shown in Table 4 and FIG. 9. The upper magnetic layer 61 in the laminated media is above a decoupling spacer layer 62. In this embodiment the lower laminate layer structure 70 includes the middle magnetic layer 63, the weak coupling layer 64 which weakly ferromagnetically couples the middle magnetic layer to the exchange enhancing layer 65. The AFC spacer layer 66 antiferromagnetically couples the lower magnetic layer 67 to the films above it. This embodiment also includes first and second underlayers 68, 69. In this structure the CoBCr is used for the exchange enhancing layer 65 and CoBRu is used for the weak coupling layer 64.

In this example the upper laminated layer is made up of a single $CoPt_{12}Cr_{14}B_{11}$ layer. This structure similarly showed improved recording performance (as outlined above) when compared to a structure without the CoBCr/CrBRu bilayer.

TABLE 4

| Layer Name | Laminated AFC Embodiment of Invention |
| --- | --- |
| upper magnetic layer 61 | $CoPt_{12}Cr_{14}B_{11}$ |
| decoupling spacer 62 | Ru |
| middle magnetic layer 63 | $CoPt_{13}Cr_{19}B_{10}$ |
| weak coupling layer 64 | CoBRu |
| exchange enhancing layer 65 | $CoB_{14}Cr_x$ |
| AFC spacer 66 | Ru |
| lower magnetic layer 67 | $CoCr_{12}Ta_2$ |
| $2^{nd}$ underlayer 68 | $CrMo_{15}B_5$ |
| $1^{st}$ underlayer 69 | Cr |
| substrate | Metal substrate |

The thin film structures described above can be formed using standard thin film deposition techniques. The films are sequentially deposited with each film being deposited on the previous film. The atomic percent compositions given above are given without regard for the small amounts of contamination that invariably exist in sputtered thin films as is well known to those skilled in the art. The invention has been described with respect to particular embodiments, but other uses and applications for the thin film structure according to the invention will be apparent to those skilled in the art.

The invention claimed is:

1. A thin film magnetic recording medium comprising:
    a first magnetic layer;
    a spacer layer above the first magnetic layer;
    a magnetic exchange enhancing layer above the spacer layer antiferromagnetically coupled to the first magnetic layer;
    a weak coupling layer above the exchange enhancing layer, the weak coupling layer being nonmagnetic at room temperature and ferromagnetic below room temperature and ferromagnetically coupling the exchange enhancing layer to a second magnetic layer;
    the second magnetic layer above and adjacent to the weak coupling layer;
    a decoupling spacer layer above the second magnetic layer; and
    a third magnetic layer above the decoupling spacer layer, the third magnetic layer being exchange decoupled from the second magnetic layer.

2. The thin film magnetic recording medium of claim 1 wherein the ferromagnetic coupling between the exchange enhancing layer and the second magnetic layer is less than direct exchange coupling.

3. The thin film magnetic recording medium of claim 1 wherein the weak coupling layer is an alloy of cobalt and ruthenium with from 50 to 80 atomic percentage ruthenium.

4. The thin film magnetic recording medium of claim 1 wherein the weak coupling layer is an alloy of cobalt, ruthenium and optionally boron with from 0 to 15 atomic percentage of boron and from 50 to 70 atomic percentage ruthenium.

5. The thin film magnetic recording medium of claim 1 wherein the weak coupling layer is an alloy of cobalt and chromium with 25 to 40 atomic percentage chromium.

6. The thin film magnetic recording medium of claim 1 wherein the magnetic exchange enhancing layer is an alloy of cobalt and boron with 5 to 30 atomic percentage of boron.

7. The thin film magnetic recording medium of claim 1 wherein the magnetic exchange enhancing layer is a ferromagnetic CoCr alloy.

8. The thin film magnetic recording medium of claim 1 wherein the magnetic exchange enhancing layer is a ferromagnetic alloy of cobalt with 5 to 20 atomic percent boron and up to 20 atomic percent chromium where combined atomic percentage of boron and chromium is less than or equal to 30 atomic percent.

9. A disk drive comprising:
    a magnetic head for writing magnetic transitions in a magnetic medium on a disk; and
    the disk with the magnetic medium comprising:
    a first magnetic layer;
    a spacer layer above the first magnetic layer;
    a magnetic exchange enhancing layer above the spacer layer antiferromagnetically coupled to the first magnetic layer;
    a weak coupling layer above the exchange enhancing layer, the weak coupling layer being nonmagnetic at room temperature and ferromagnetic below room temperature and ferromagnetically coupling the exchange enhancing layer to a second magnetic layer;
    the second magnetic layer above and adjacent to the weak coupling layer;
    a decoupling spacer layer above the second magnetic layer; and
    a third magnetic layer above the decoupling spacer layer, the third magnetic layer being exchange decoupled from the second magnetic layer.

10. The disk drive of claim 9 wherein an effective coupling field created by the weak coupling layer is approximately equal to a write field in the second magnetic layer generated by the magnetic head.

11. The disk drive of claim 9 wherein the weak coupling layer is an alloy of cobalt and ruthenium with from 50 to 80 atomic percentage ruthenium.

12. The disk drive of claim 9 wherein the weak coupling layer is an alloy of cobalt, ruthenium and optionally boron with from 0 to 15 atomic percentage of boron and from 50 to 70 atomic percentage ruthenium.

13. The disk drive of claim 9 wherein the weak coupling layer is an alloy of cobalt and chromium with 25 to 40 atomic percentage chromium.

14. The disk drive of claim 9 wherein the magnetic exchange enhancing layer is an alloy of cobalt and boron with 5 to 30 atomic percentage of boron.

15. The disk drive of claim 9 wherein the magnetic exchange enhancing layer is a ferromagnetic CoCr alloy.

16. The disk drive of claim 9 wherein the magnetic exchange enhancing layer is a ferromagnetic alloy of cobalt with 5 to 20 atomic percent boron and up to 20 atomic percent chromium where combined atomic percentage of boron and chromium is less than or equal to 30 atomic percent.

* * * * *